W. F. FESSLER.
WASHBOILER ATTACHMENT.
APPLICATION FILED MAR. 5, 1908.
904,191.
Patented Nov. 17, 1908.
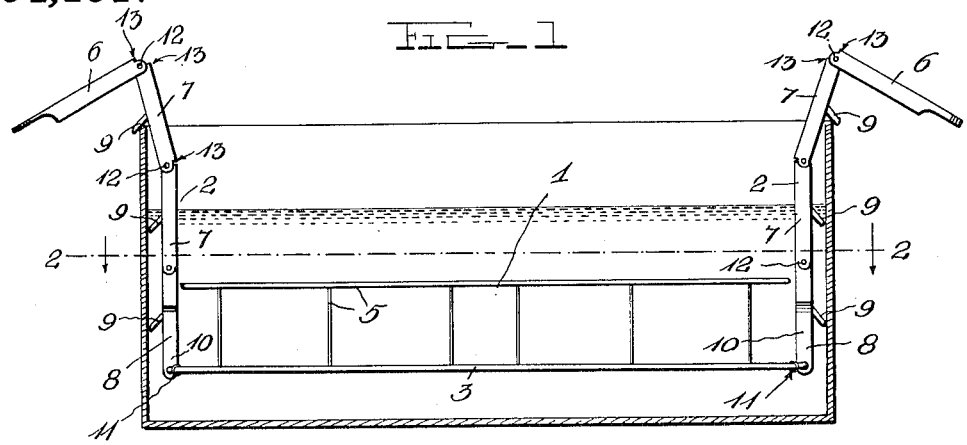
Witnesses
C. H. Griesbauer
Inventor
Weaver F. Fessler
By H. B. Willson & Co.
Attorneys

UNITED STATES PATENT OFFICE.

WEAVER F. FESSLER, OF NEW CASTLE, PENNSYLVANIA.

WASHBOILER ATTACHMENT.

No. 904,191.  Specification of Letters Patent.  Patented Nov. 17, 1908.

Application filed March 5, 1908. Serial No. 419,379.

*To all whom it may concern:*

Be it known that I, WEAVER F. FESSLER, a citizen of the United States, residing at New Castle, in the county of Lawrence and State of Pennsylvania, have invented certain new and useful Improvements in Washboiler Attachments; and I do declare the following to be a full, clear, and exact description of the invention, such as will enable others skilled in the art to which it appertains to make and use the same.

This invention relates to attachments for wash boilers and has for its object to provide an attachment whereby clothes or the like when being boiled may be held in a wire cage at any desired distance from the bottom of the boiler.

Another object is to provide a device of this kind which will be easily and cheaply manufactured, which will be efficient in operation and which will not get out of order.

For these and other objects which will appear hereinafter this invention consists of certain novel combinations and arrangements of parts of which the herein described boiler attachment is an embodiment.

In the annexed drawings forming a part of this specification in which like reference characters refer to like parts throughout the several views, Figure 1 is a side elevation of my boiler attachment as applied to a boiler, the boiler being shown in longitudinal section. Fig. 2 is a top plan view of the same. Fig. 3 is a top plan view of the cage with the handle thereof in extended position and Fig. 4 is a side elevation partly in section of one of the handles of said cage.

Referring more particularly to the drawings which are for illustrative purposes only and therefore not drawn to any particular scale, the herein-described embodiment of my invention is shown as comprising a cage 1, to the ends of which are fastened hooked sectional supporting handles 2.

The cage 1 consists of an outer surrounding member 3 having crossed bottom members 4 to form a basket bottom and may if desired be also provided with upstanding members forming the sides 5 of the cage.
The cage as thus far described may be made of any material desired but wire of sufficient strength and stiffness is preferred.

It is particularly understood that I do not limit myself to the form of cage shown.

At opposite ends of the surrounding member 3 and hingedly connected thereto are provided the handle members 2 above mentioned. These members comprise handle sections 6, intermediate sections 7 and hinged sections 8, all of which sections except the handle sections are provided with laterally extending downward curved hooks 9, any one of which is adapted to be hooked over the edge of the boiler as shown, thus providing means whereby the bottom of the cage may be held at any predetermined distance from the bottom of the boiler.

The hinged section 8 is provided at its lower end with spaced prongs 10 the lower end of which prongs encircle the surrounding member 3 whereby said hinged section 8 is riveted to said cage.

Four of the cross members 4 are passed around the member 3 one on each side of said prongs as shown at 11 whereby said prongs 10 are held against sliding movement on said surrounding member 3.

Each of the members 8 are provided with hooks 9 arranged on either side of the member in order that there will be no tendency of the cage to become unbalanced when it is at its highest adjustment.

The handle members 2 are provided with the sections 6, 7 and 8 hingedly connected to each other as at 12 in order that said handles may be folded out of the way against the outer side of the boiler to prevent said handles from being folded over into the boiler.

I provide at each end of each section opposing shoulders 13 whereby movement between said sections is permitted in one direction but not in the other as will be easily understood by referring to Fig. 4.

While I have described with great particularity the details of the cage handles, it is understood that I may use any kind of handles which I wish or I may substitute for handles any means which will hold the cage at the desired distance from the bottom of the boiler.

When the cage is at its lower adjustment the bottom thereof is just high enough above the bottom of the boiler to give free circulation of water underneath and to prevent the clothes from touching the bottom of the boiler and thus becoming scorched.

By raising the case up to the second hook the clothes may be drawn up high enough to allow the same to drip, the same can be raised up to the third notch which will raise the clothes entirely out of the water.

This invention is proposed to obviate the difficulty of digging boiling clothes out of the boiling water with a hook or stick and is made for the purpose of raising them out of the boiler and letting the boiling water drip away from them.

While herein I have described minute details of my invention I do not limit myself to these, as the details of construction and arrangement may be greatly varied without departing from the spirit and scope of the invention.

Having thus described my invention, what I claim as new and desire to secure by Letters-Patent is:—

A device of the class described, comprising a cage member and handle members hinged thereto, each of said handle members consisting of a series of sections hingedly connected to each other, each of said sections being provided with a laterally extending hook.

In testimony whereof I have hereunto set my hand in presence of two subscribing witnesses.

WEAVER F. FESSLER.

Witnesses:
L. R. DAVIDSON,
ROBERT L. WALLACE.